(12) United States Patent
Li et al.

(10) Patent No.: US 10,856,035 B2
(45) Date of Patent: Dec. 1, 2020

(54) MESSAGE SHARING METHOD, CLIENT, AND COMPUTER STORAGE MEDIUM

(71) Applicant: TENCENT TECHNOLOGY (SHENZHEN) COMPANY LIMITED, Shenzhen (CN)

(72) Inventors: Zhongwei Li, Shenzhen (CN); Xiaohui Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 15/628,432

(22) Filed: Jun. 20, 2017

(65) Prior Publication Data

US 2017/0289608 A1 Oct. 5, 2017

Related U.S. Application Data

(63) Continuation of application No. PCT/CN2016/082270, filed on May 16, 2016.

(30) Foreign Application Priority Data

Jun. 16, 2015 (CN) .......................... 2015 1 0334944

(51) Int. Cl.
*H04N 21/43* (2011.01)
*H04N 21/4788* (2011.01)
(Continued)

(52) U.S. Cl.
CPC ............. *H04N 21/43* (2013.01); *H04N 21/40* (2013.01); *H04N 21/42684* (2013.01);
(Continued)

(58) Field of Classification Search
CPC ............... H04N 21/43; H04N 21/4882; H04N 21/4751; H04N 21/42684;
(Continued)

(56) References Cited

U.S. PATENT DOCUMENTS 7,330,895 B1 * 2/2008 Horvitz .................. G06Q 10/10
455/414.1
7,996,566 B1 * 8/2011 Sylvain .................... H04N 7/15
709/248
(Continued)

FOREIGN PATENT DOCUMENTS

CN 101873467 A 10/2010
CN 102026037 A 4/2011
(Continued)

OTHER PUBLICATIONS

International Search Report in international application No. PCT/CN2016/082270, dated Aug. 11, 2016.
(Continued)

*Primary Examiner* — Jimmy H Tran
(74) *Attorney, Agent, or Firm* — Anova Law Group, PLLC

(57) ABSTRACT

A method to effectively share a message includes: establishing an association relationship between a first electronic device and a device account thereof; controlling the first electronic device to play first multimedia data by using the device account, sending an invitation link to a client corresponding to a second account; receiving, by using the device account, second message data sent by the client corresponding to the second account when the client corresponding to the second account accepts the invitation link; and sending first message data sent by a client corresponding to the first account and received by the device account and the second message data to the first electronic device, so as to display the message data on the first multimedia data.

10 Claims, 8 Drawing Sheets

(51) Int. Cl.
*H04N 21/442* (2011.01)
*H04N 21/426* (2011.01)
*H04N 21/475* (2011.01)
*H04N 21/488* (2011.01)
*H04N 21/4367* (2011.01)
*H04N 21/40* (2011.01)
*H04N 21/00* (2011.01)

(52) U.S. Cl.
CPC ... *H04N 21/4367* (2013.01); *H04N 21/44222* (2013.01); *H04N 21/4751* (2013.01); *H04N 21/4788* (2013.01); *H04N 21/4882* (2013.01); *H04N 21/00* (2013.01)

(58) Field of Classification Search
CPC .............. H04N 21/44222; H04N 21/40; H04N 21/4367; H04N 21/4788; H04N 21/00; H04N 21/4307
See application file for complete search history.

(56) References Cited

U.S. PATENT DOCUMENTS

| | | | | |
|---|---|---|---|---|
| 8,250,594 | B2* | 8/2012 | Maruyama | H04N 7/163 725/9 |
| 8,412,772 | B1* | 4/2013 | Nguyen | H04N 21/2187 709/204 |
| 8,929,922 | B2* | 1/2015 | Ginn | H04N 21/482 455/456.3 |
| 9,230,241 | B1* | 1/2016 | Singh | H04N 21/41407 |
| 9,417,765 | B1* | 8/2016 | Lewis | G06F 16/748 |
| 9,461,949 | B2* | 10/2016 | Grue | H04L 65/403 |
| 9,514,785 | B2* | 12/2016 | Bargas | G06F 16/743 |
| 9,661,390 | B2* | 5/2017 | Li | G06F 3/033 |
| 10,055,696 | B2* | 8/2018 | Engle | G06Q 50/01 |
| 10,069,888 | B1* | 9/2018 | Ho | H04L 65/604 |
| 10,158,917 | B1* | 12/2018 | Logan | G06F 3/011 |
| 10,225,627 | B2* | 3/2019 | Brelis | H04N 21/47205 |
| 10,375,447 | B1* | 8/2019 | Carpenter | H04N 21/6547 |
| 10,638,166 | B2* | 4/2020 | Chen | H04N 21/2743 |
| 2003/0236832 | A1* | 12/2003 | McIntyre | H04L 67/325 709/204 |
| 2004/0041836 | A1* | 3/2004 | Zaner | G06F 3/0481 715/751 |
| 2004/0205091 | A1 | 10/2004 | Mulcahy | |
| 2006/0190827 | A1 | 8/2006 | Zaner | |
| 2006/0190828 | A1 | 8/2006 | Zaner | |
| 2006/0190829 | A1 | 8/2006 | Zaner | |
| 2007/0199025 | A1* | 8/2007 | Angiolillo | H04N 21/4113 725/47 |
| 2008/0229215 | A1* | 9/2008 | Baron | G06N 3/006 715/751 |
| 2009/0044216 | A1* | 2/2009 | McNicoll | G11B 27/105 725/5 |
| 2009/0125961 | A1* | 5/2009 | Perlman | A63F 13/12 725/112 |
| 2010/0037277 | A1* | 2/2010 | Flynn-Ripley | H04L 29/12896 725/110 |
| 2010/0205318 | A1* | 8/2010 | Melnyk | H04N 21/41407 709/231 |
| 2010/0229105 | A1 | 9/2010 | Zaner | |
| 2010/0306671 | A1* | 12/2010 | Mattingly | G06Q 10/10 715/753 |
| 2011/0126258 | A1* | 5/2011 | Emerson | H04L 51/04 725/133 |
| 2011/0154417 | A1* | 6/2011 | Civanlar | H04N 7/15 725/105 |
| 2011/0296472 | A1* | 12/2011 | Soldan | H04N 5/4401 725/81 |
| 2012/0066613 | A1* | 3/2012 | Berger | G06Q 30/01 715/751 |
| 2012/0239618 | A1* | 9/2012 | Kung | G06F 21/6218 707/621 |
| 2013/0036168 | A1* | 2/2013 | Upton | H04L 12/1827 709/204 |
| 2013/0086615 | A1* | 4/2013 | Williams | H04N 21/41407 725/62 |
| 2013/0218942 | A1* | 8/2013 | Willis | G06Q 50/01 709/201 |
| 2013/0246584 | A1* | 9/2013 | Barton | H04L 67/325 709/219 |
| 2014/0053182 | A1* | 2/2014 | Jaager | H04N 21/41415 725/25 |
| 2014/0096169 | A1* | 4/2014 | Dodson | H04N 21/262 725/97 |
| 2014/0313282 | A1* | 10/2014 | Ma | H04N 7/152 348/14.09 |
| 2014/0325561 | A1* | 10/2014 | Allen | H04N 21/2393 725/38 |
| 2015/0033153 | A1* | 1/2015 | Knysz | G06Q 50/01 715/753 |
| 2015/0086173 | A1* | 3/2015 | Abecassis | H04N 21/8126 386/201 |
| 2016/0066021 | A1* | 3/2016 | Thomas | H04N 21/4312 725/14 |
| 2016/0316272 | A1* | 10/2016 | Li | H04N 21/4788 |
| 2017/0026321 | A1* | 1/2017 | Ciavatta | H04L 51/04 |
| 2017/0085599 | A1* | 3/2017 | Roche | H04L 67/10 |
| 2018/0337880 | A1* | 11/2018 | Sokolov | H04N 21/6581 |

FOREIGN PATENT DOCUMENTS

| | | |
|---|---|---|
| CN | 102918835 A | 2/2013 |
| CN | 104661057 A | 5/2015 |
| CN | 104954882 A | 9/2015 |

OTHER PUBLICATIONS

Notification of the Second Office Action of Chinese application No. 201510334944.7, dated Mar. 16, 2018.
English Translation of the Written Opinion of the International Search Authority in international application No. PCT/CN2016/082270, dated Aug. 11, 2016.

* cited by examiner

MESSAGE SHARING METHOD, CLIENT, AND COMPUTER STORAGE MEDIUM

CROSS REFERENCE TO RELATED APPLICATIONS

This is a continuation application of International Patent Application No. PCT/CN2016/082270, filed on May 16, 2016, which claims priority to Chinese Patent Application No. 201510334944.7 filed on Jun. 16, 2015. The disclosures of these applications are incorporated by references herein in their entirety.

BACKGROUND

With the rapid development of Internet technology, Wireless Fidelity (WiFi) Internet TV emerges and becomes widely popular. After accessing a network, an Internet smart TV can provide various entertainments, such as, online videos, an IE browser, full High Definition (HD) three-dimensional (3D) motion sensing games, video calls, a home KTV, and online education or the like. All major TV makers are producing Internet smart TV embedded with various applications, and the TV becomes more and more powerful, the content gets richer and richer, and the experience is better and better. The Internet smart TV is increasingly becoming the first choice of modern families due to its rich content, and people hope to obtain smarter and richer home entertainments through the TV.

Although the Internet TV provides various entertainment resources, watching videos on the TV is still the most leading way of entertainment. Because of today's developed Internet social contact, people tend to share when watching videos. However, the existing way of watching the Internet TV is still the way of watching the traditional TV, that is, watching in a living room, which is an independent space, without a channel for sharing instantly when people have thoughts and feelings.

SUMMARY

To solve the above technical problems, embodiments of the disclosure provide a method for sharing a message, a client, and a computer storage medium.

A method for sharing a message provided by an embodiment of the disclosure includes that:

an association relationship between a first electronic device and a device account thereof is established;

the first electronic device is controlled to play first multimedia data by using the device account, and an invitation link is sent to a client corresponding to a second account;

when the client corresponding to the second account accepts the invitation link, second message data sent by the client corresponding to the second account is received by using the device account, wherein a device account associated with the second account controls a second electronic device to play the first multimedia data synchronously; and first message data that is sent by a client corresponding to a first account and received by the device account and the second message data are sent to the first electronic device, so as to display the message data on the first multimedia data.

A method for sharing a message provided by another embodiment of the disclosure includes that:

an invitation link that is sent by a device account associated with a first account is received, wherein the device account associated with the first account controls a first electronic device to play first multimedia data;

in response to the invitation link, second message data is sent to a device account associated with a second account, and the first multimedia data is played on a second electronic device synchronously; and first message data that is sent by a client corresponding to the first account and received by the device account associated with the second account and the second message data are sent to the second electronic device, so as to display the message data on the first multimedia data.

A client provided by an embodiment of the disclosure includes:

an associating module configured to establish the association relationship between a first electronic device and a device account thereof;

a controlling module configured to control the first electronic device to play first multimedia data by using the device account, and send an invitation link to a client corresponding to a second account;

a receiving module configured to, when the client corresponding to the second account accepts the invitation link, receive second message data sent by the client corresponding to the second account by using the device account, wherein a device account associated with the second account controls a corresponding second electronic device to play the first multimedia data synchronously; and a projecting module configured to send the first message data that is sent by a client corresponding to a first account and received by the device account and the second message data to the first electronic device, so as to display the message data on the first multimedia data.

A client provided by another embodiment of the disclosure includes:

a receiving module configured to receive an invitation link that is sent by a device account associated with a first account, wherein the device account associated with the first account controls a first electronic device to play first multimedia data;

a responding module configured to, in response to the invitation link, send second message data to a device account associated with a second account;

a controlling module configured to play the first multimedia data on a second electronic device synchronously; and a projecting module configured to send first message data that is sent by a client corresponding to the first account and received by the device account associated with the second account and the second message data to the second electronic device, so as to display the message data on the first multimedia data.

A computer storage medium provided by an embodiment of the disclosure stores computer executable instructions used for performing the above methods for sharing a message.

In the technical solutions of the disclosure, the first and second electronic devices are especially a TV and the first and second accounts are especially an account for logging in a certain application. A user can establish an association relationship between the first electronic device and the device account thereof, thereby realizing the binding. Another user can also establish an association relationship between the second electronic device and the device account thereof, thereby realizing the binding. In such a manner, the users can control their own electronic devices to play videos and other data through their own device accounts. When the user is interested in the video that he/she is watching and wants to discuss with a friend in real time, the user uses a public account to send an invitation link to the friend side (the client corresponding to the second account). After accepting the invitation link, the friend can join a discussion group of the public account, and watch the first multimedia data on the second electronic device synchronously. All the users (the clients) joining the group can chat and discuss in the public account, and the content of chat and discussion will be displayed on their own electronic devices in real time. With the technical solutions of the disclosure, when watching a video, the user initiates a friend invitation, and the friend enters a group chat after responding to the invitation. They share their own watching feelings in the group in real time, and project respective chat content on the screens of their respective electronic devices instantly, thereby realizing the social contact based on viewing and getting richer watching experience.

DETAILED DESCRIPTION

In order to understand the features and technical content in the embodiments of the disclosure in more detail, the implementation of the embodiments of the disclosure is elaborated in combination with the accompanying drawings. The accompanying drawings are only used for reference, but not intended to limit the embodiments of the disclosure.

Figure 1:
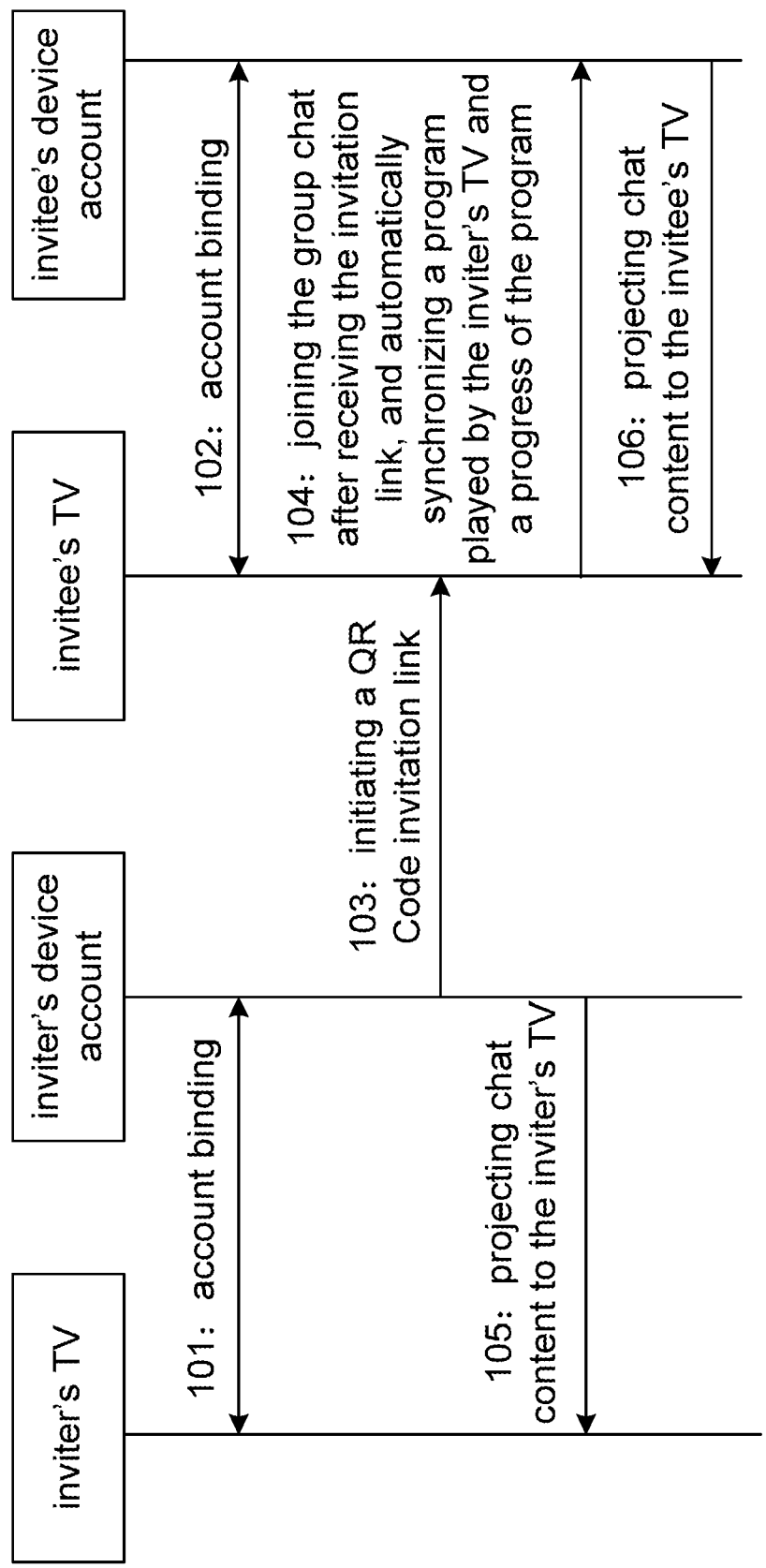
FIG. 1 is a flowchart showing a method for sharing a message according to embodiment one of the disclosure.

FIG. 1 is a flowchart showing a method for sharing a message according to embodiment one of the disclosure. The method for sharing a message in the embodiment involves four execution bodies, which are an inviter's TV, an inviter's mobile phone, an invitee's TV and an invitee's mobile phone respectively. Here, the TV may also be other electronic devices with a display function, such as a display screen and an all-in-one machine. The mobile phone may also be a tablet computer and other electronic devices. The inviter is the inviter of video sharing, and the invitee is the invitee of video sharing. The inviter's TV and the inviter's mobile phone are connected to the same network, for example, WiFi. The invitee's TV and the invitee's mobile phone are connected to the same network. As shown in FIG. 1, the method for sharing a message includes the following steps.

At Step 101, the inviter's TV is bound with its device account.

In the embodiment of the disclosure, the inviter's mobile phone has an application client, for example, a chat application client. The user logs in the application client with his/her own first account, and scans the device account on the TV, so as to bind the inviter's TV with its device account.

In the embodiment of the disclosure, the device account on the TV is a public account of a device, which can be displayed on the TV through a QR code.

Here, after the inviter's TV is bound with its device account, the user can operate the inviter's TV through the device account in the mobile phone.

At Step 102, the invitee's TV is bound with its device account.

In the embodiment of the disclosure, the invitee's mobile phone also has an application client. The user logs in the application client with his/her own second account, and scans the device account on the TV, so as to bind the invitee's TV with its device account.

Here, after the invitee's TV is bound with its device account, the user can operate the invitee's TV through the device account in the mobile phone.

At Step 103, the inviter's TV plays a video, and when the inviter watches the content he/she wants to share and communicate with a friend, he/she initiates a QR code invitation link in the device account of the inviter's mobile phone.

Here, it is feasible to invite the chat friend to join in watching the video and chatting in group.

At Step 104, the invitee's mobile phone joins the group chat by scanning the QR code after receiving the invitation link; and the invitee's TV, after being opened, automatically synchronizes a program and progress thereof being played on the inviter's TV.

Here, the invitee's TV plays the program that the inviter is watching on the inviter's TV from the current playing progress. The friend that has joined the group chat may initiate communication aiming at the content played and share their watching feelings.

At Step 105, the chat content is projected to the inviter's TV.

At Step 106, the chat content is projected to the invitee's TV.

In the embodiment of the disclosure, because the current remote operation of TV is limited, in order to implement the function faster, the device account is used to operate the TV. The user is required to bind the device account of the TV with the TV. When the user watches the content of interest and wants to share and communicate with a friend, the user generates a QR code invitation link through the device account and sends the link to the friend. The friend may scan the QR code to enter the discussion group after receiving the invitation, and directly locates the playing position of the video on the inviter's TV. The chat content in the group may also be projected on the TV screen in real time.

Figure 2:
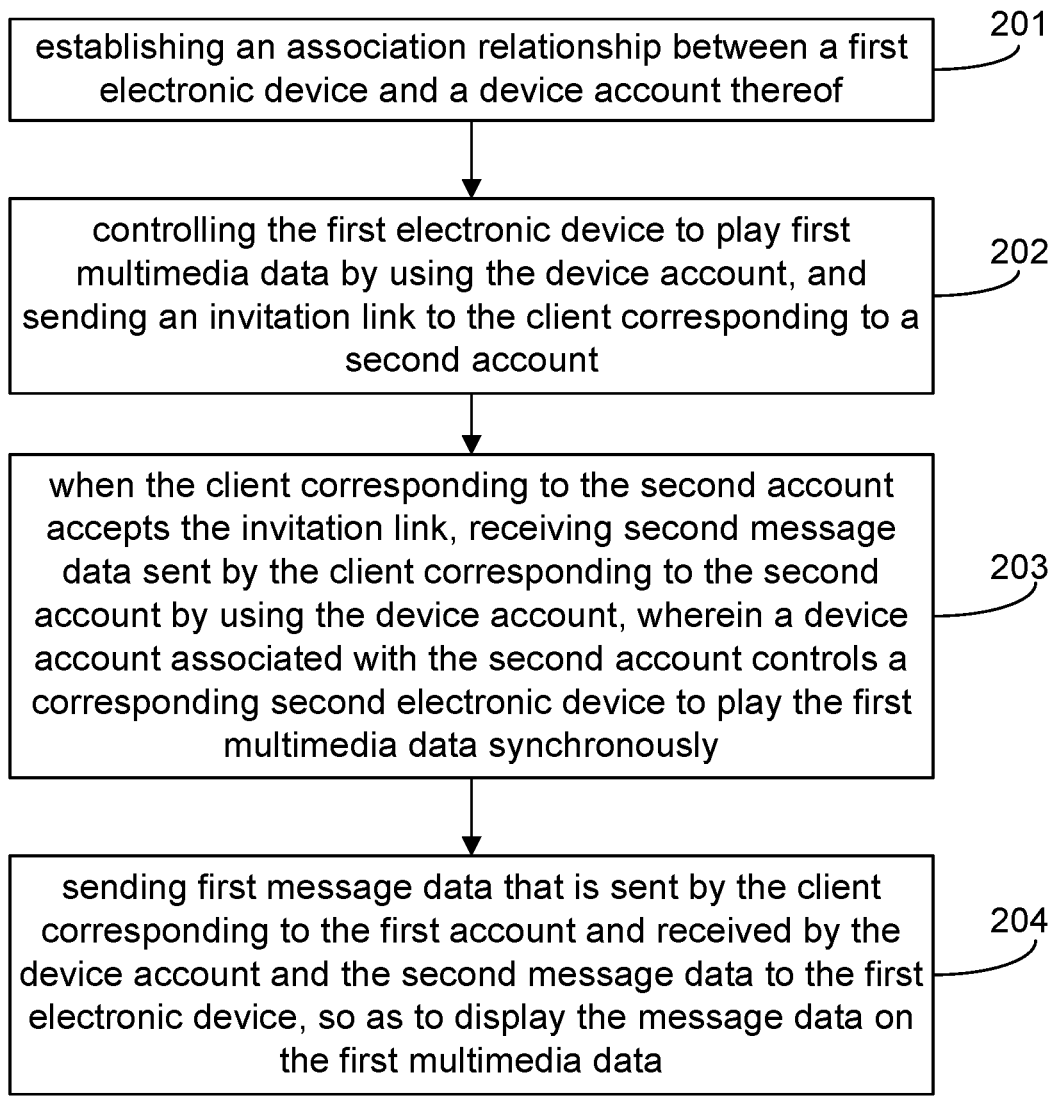
FIG. 2 is a flowchart showing a method for sharing a message according to embodiment two of the disclosure.

FIG. 2 is a flowchart showing a method for sharing a message according to embodiment two of the disclosure. The method for sharing a message in the embodiment is applied to the inviter. In the embodiment of the disclosure, the first and second electronic devices are especially a TV. The first and second accounts are especially an account for logging in a certain application. As shown in FIG. 2, the method for sharing a message includes the following steps.

At Step 201, an association relationship between the first electronic device and its device account is established.

In the embodiment of the disclosure, a user may establish the association relationship between the first electronic device and its device account, thereby realizing the binding.

Another user may also establish the association relationship between the second electronic device and its device account, thereby realizing the binding. In such a manner, the users may control their own electronic devices to play videos and other data through the respective device accounts.

In the embodiment of the disclosure, the user logs in with the first account, and scans an identifier on the first electronic device, wherein the identifier represents the device account. After successful scanning, the association relationship between the first electronic device and its device account is established.

Specifically, the device account of the first electronic device is displayed on the first electronic device, and it may be a QR code. The user logs in the application client with the first account, and scans the device account of the first electronic device by using the application client. After the scanning is successful, the device account is added, thereby realizing the binding of the first electronic device and its device account. Similarly, the device account of the second electronic device is displayed on the second electronic device, and it may be a QR code. The user logs in the application client with the second account, and scans the device account of the second electronic device by using the application client. After the scanning is successful, the device account is added, thereby realizing the binding of the second electronic device and its device account.

AT Step 202, the first electronic device is controlled to play first multimedia data by using the device account, and the invitation link is sent to the client corresponding to the second account.

In the embodiment of the disclosure, after the device account is bound with the first electronic device, the user may control the first electronic device through the device account. For example, the user controls the first electronic device to play the selected video content. When the user is interested in the video that he/she is watching and wants to discuss with a friend in real time, the user sends the invitation link to the friend side (the client corresponding to the second account) by using the public account.

AT Step 203, when the client corresponding to the second account accepts the invitation link, second message data that is sent by the client corresponding to the second account is received by using the device account, wherein the device account associated with the second account controls the corresponding second electronic device to play the first multimedia data synchronously.

In the embodiment of the disclosure, after accepting the invitation link, the friend (the client corresponding to the second account) may join the discussion group of the public account and watch the first multimedia data on its own second electronic device synchronously. All the users (clients) joining the group may chat and discuss in the public account, and the content of chat and discussion is sent to the device account. In such a manner, second message data sent by the client corresponding to the second account may be received by using the device account. It is noted that there may be several second electronic devices, so the content of chat sent by several users may be in the public account.

At Step 204, first message data that is sent by the client corresponding to the first account and received by the device account and the second message data are sent to the first electronic device, so as to display the message data on the first multimedia data.

In the embodiment of the disclosure, the content of chat and discussion may be displayed on the electronic devices of the users in real time. With the technical solutions of the disclosure, when watching a video, the user initiates a friend invitation, and the friend enters the group chat after responding to the invitation. They share their own watching feelings in the group in real time, and project the chat content on the screens of the electronic devices instantly, thereby realizing the social contact based on viewing and getting a richer watching experience.

Figure 3:
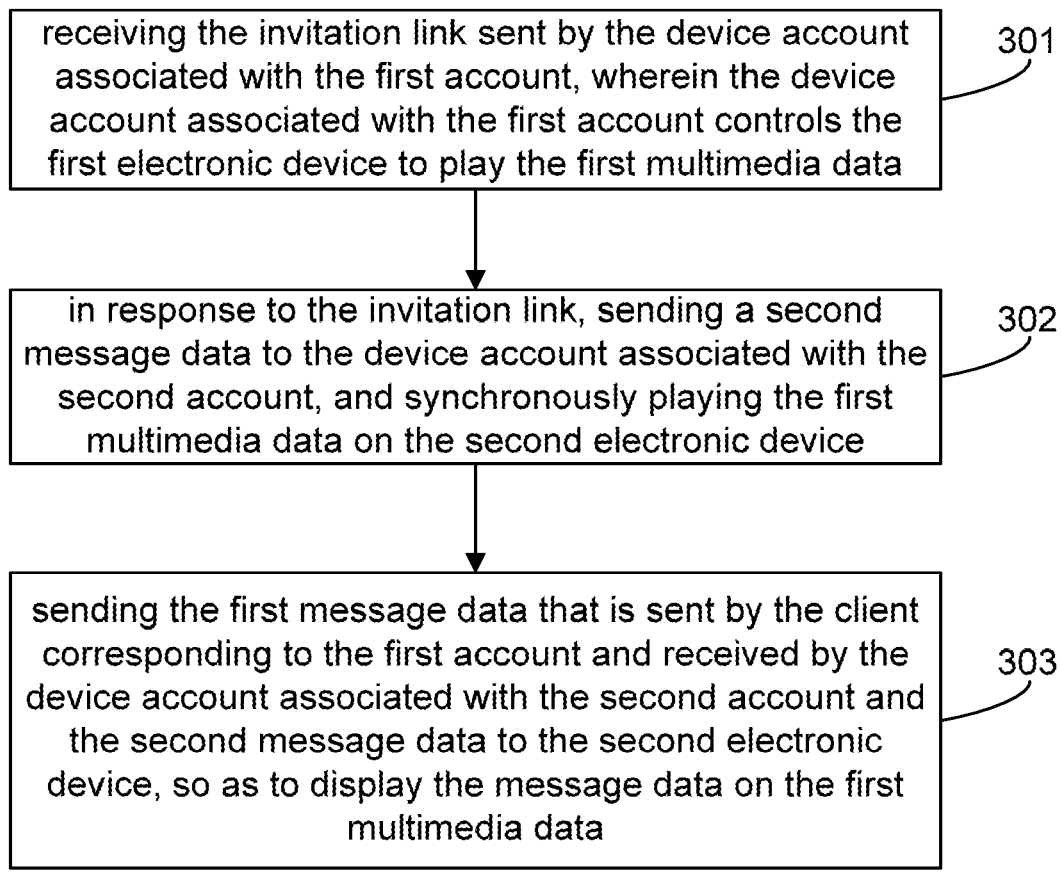
FIG. 3 is a flowchart showing a method for sharing a message according to embodiment three of the disclosure.

FIG. 3 is a flowchart showing a method for sharing a message according to embodiment three of the disclosure. The method for sharing a message in the embodiment is applied to the invitee. In the embodiment of the disclosure, the first and second electronic devices are especially a TV and the first and second accounts are especially an account for logging in a certain application. As shown in FIG. 3, the method for sharing a message includes the following steps.

At Step 301, the invitation link sent by the device account associated with the first account is received, wherein the device account associated with the first account controls the first electronic device to play the first multimedia data.

In the embodiment of the disclosure, a user may establish the association relationship between the first electronic device and its device account, thereby realizing the binding. Another user may also establish the association relationship between the second electronic device and its device account, thereby realizing the binding. In such a manner, the users can control their own electronic devices to play videos and other data through the device account.

In the embodiment of the disclosure, the invitation link may be realized by a QR code.

Specifically, the device account of the first electronic device is displayed on the first electronic device, and it may be a QR code. The user logs in the application client with the first account, and scans the device account of the first electronic device by using the application client. After the scanning is successful, the device account is added, thereby realizing the binding of the first electronic device and its device account. Similarly, the device account of the second electronic device is displayed on the second electronic device, and it may be a QR code. The user logs in the application client with the second account, and scans the device account of the second electronic device by using the application client. After the scanning is successful, the device account is added, thereby realizing the binding of the second electronic device and its device account.

In the embodiment of the disclosure, after the device account is bound with the first electronic device, the user can control the first electronic device through the device account. For example, the user controls the first electronic device to play the selected video content. When the user is interested in the video that he/she is watching and wants to discuss with a friend in real time, the user sends the invitation link to the friend side by using the public account. The client corresponding to the second account receives the invitation link sent by the device account associated with the first account.

At Step 302, in response to the invitation link, the second message data is sent to the device account associated with the second account, and the first multimedia data is played on the second electronic device synchronously.

In the embodiment of the disclosure, after response to the invitation link, it is determined that the second electronic device is associated with the corresponding device account. When the second electronic device is not associated with the corresponding device account, the association relationship between the second electronic device and the corresponding device account is established, and the second message data is sent to the device account. When the second electronic device is associated with the corresponding device account, the second message data is directly sent to the device account.

In the embodiment of the disclosure, a playing progress that the first electronic device plays the first multimedia data is obtained and the first multimedia data is played on the second electronic device synchronously according to the playing progress.

In the embodiment of the disclosure, when the obtained playing progress indicates that the first electronic device does not play the first multimedia data currently, prompt information is sent.

In the embodiment of the disclosure, the identifier on the invitation link is scanned, and the prompt information for giving a prompt to play the first multimedia data is obtained; and a playing selection operation is obtained, and the invitation link is accepted.

At Step 303, the first message data that is sent by the client corresponding to the first account and received by the device account associated with the second account and the second message data are sent to the second electronic device, so as to display the message data on the first multimedia data.

Figure 4:
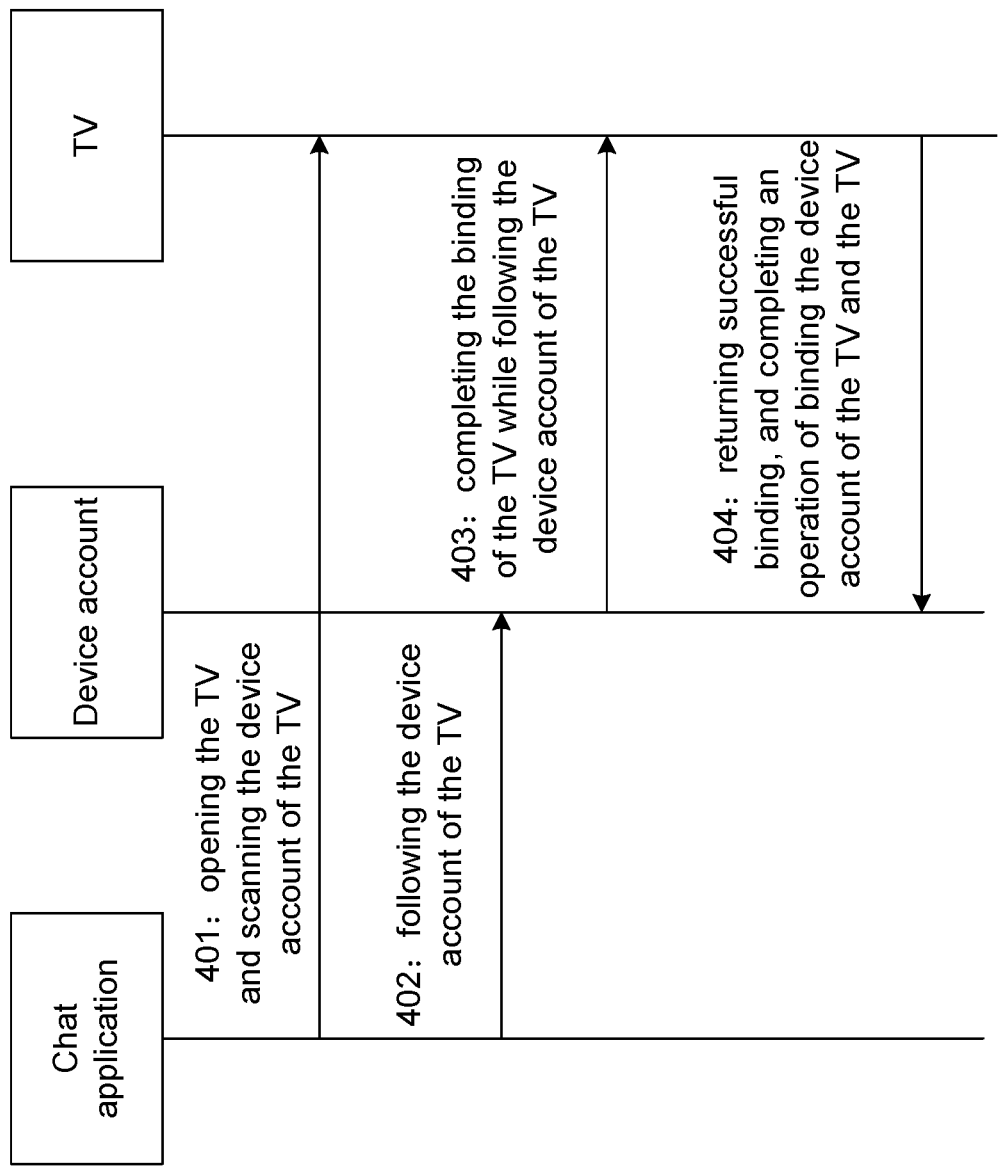
FIG. 4 is a flowchart showing a process of establishing an association relationship between an electronic device and a device account thereof according to an embodiment of the disclosure.

FIG. 4 is a flowchart showing a process of establishing an association relationship between an electronic device and its device account according to an embodiment of the disclosure. In the embodiment, in order to use the mobile phone to operate the TV, it is required to realize a communication mechanism between the mobile phone and a TV video application. At present, home WiFi is very popular, and the home Internet TV is connected to the Internet generally through WiFi. A local area network communication between the TV and the mobile phone may be established in a home WiFi environment, or Bluetooth communication is adopted. As shown in FIG. 4, the flow includes the following steps.

At Step 401, open the TV and scan the device account of the TV.

At Step 402, follow the device account of the TV.

At Step 403, complete the binding of the TV while following the device account.

At Step 404, return an indication of successful binding, and complete an operation of binding the device account and the TV.

The embodiment of the disclosure may realize the interconnection between the mobile phone and the TV through the communication between the public account and the TV.

Figure 5A:
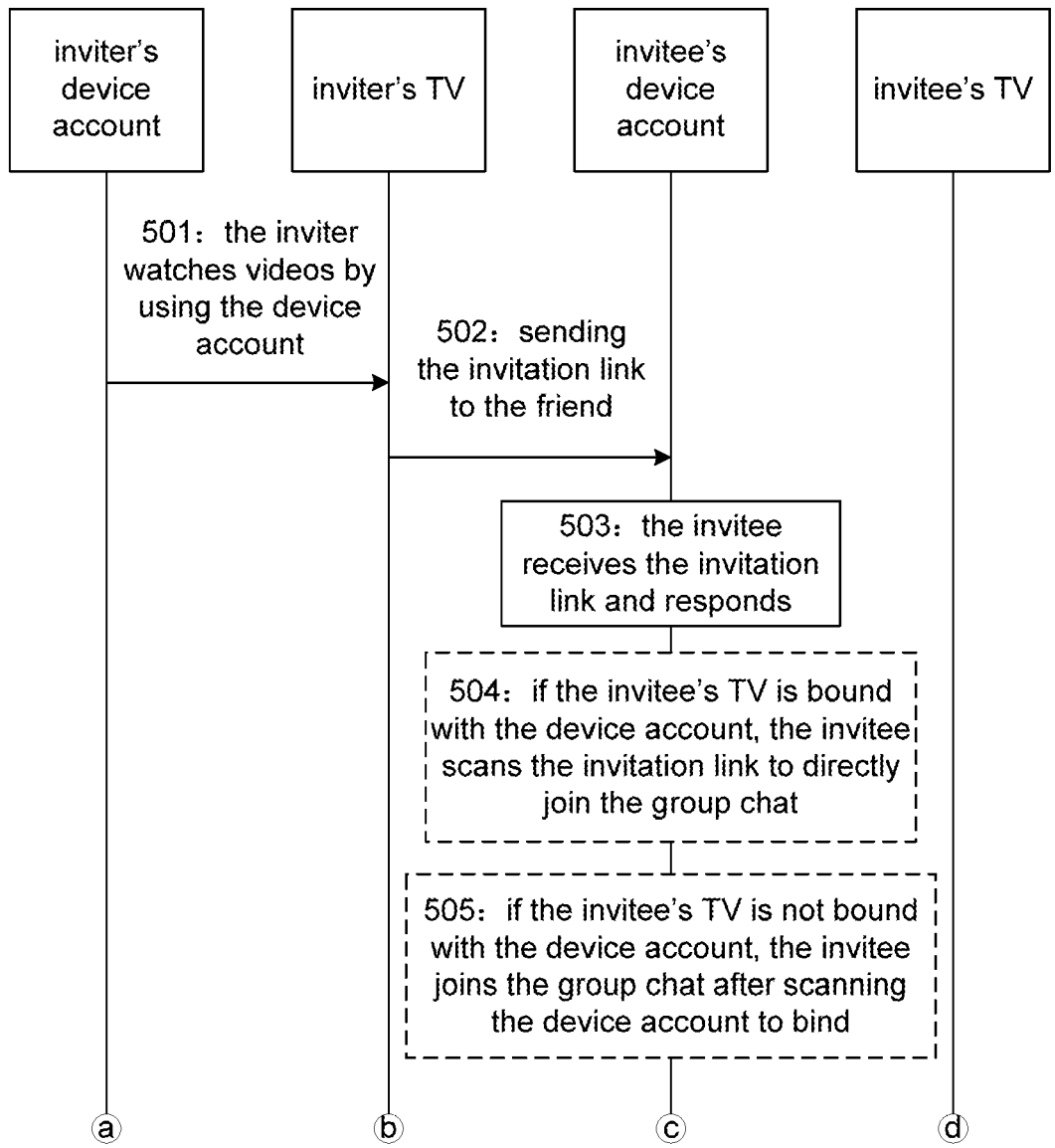
FIG. 5A is a first portion of a flowchart showing a process of inviting a friend to join a discussion group according to an embodiment of the disclosure.
Figure 5B:
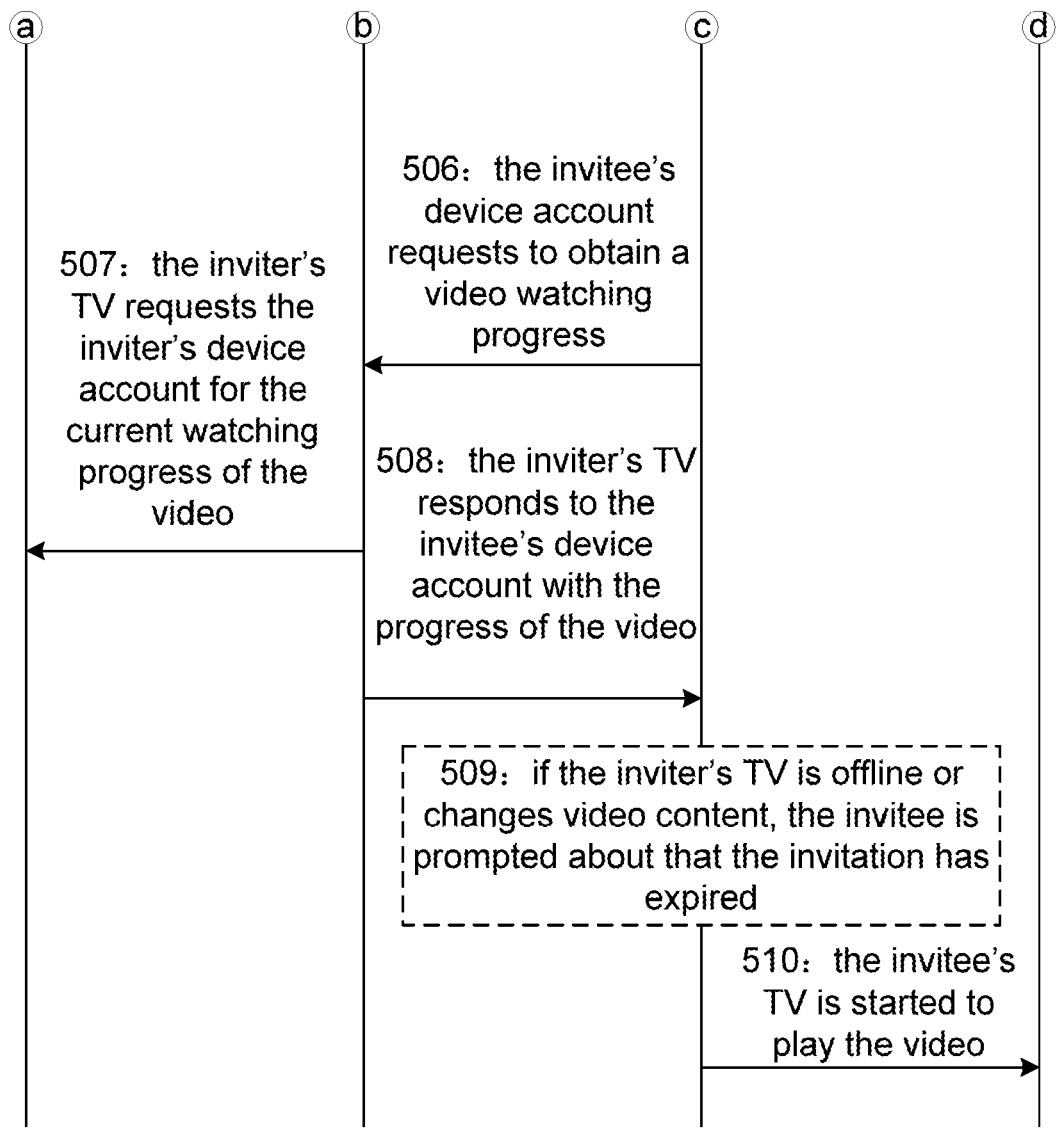
FIG. 5B is a second portion of the flowchart showing a process of inviting a friend to join a discussion group according to an embodiment of the disclosure.

FIG. 5A and FIG. 5B are respectively a first portion and a second portion of a flowchart showing a process of inviting a friend to join a discussion group according to an embodiment of the disclosure. In the embodiment, after the binding of the device account and the TV is realized, the function of quickly selecting a film may be implemented by using the device account. After selecting a film of interest, the user clicks to watch, and the device account will communicate with a video application of the TV to inform the application to automatically obtain and play the selected film. When watching the film, the user may quickly invite a friend to share and communicate, and the operation is completed still on the mobile phone. The device account sets an entry of the function. The user enters the device account and clicks to invite his/her friends to share, so as to invite his/her friends to participate based on the friend chain. After the user selects the friend that he/she wants to share, the chat application will initiate an invitation link to the friend. In order to facilitate the friend's operation, a QR code invitation is designed. The invited friend may receive a QR code invitation link, and then the friend scans the QR code to respond to the invitation. The user may know, by scanning the QR code, which friend initiates a sharing invitation for that film, and the friend may select whether to respond to the invitation according to his/her interest.

When the user selects to accept the invitation, if the user has followed the device account of the TV, the user scans the QR code of the invitation link to automatically join the group chat in the public account. If the user has not followed the device account of the TV, the user scans the QR code of the device account to automatically follow the device account of the TV and join the group chat in the public account, so as to prompt the user to open the TV to complete the binding of the device account and the TV.

After the binding of the device account and the TV is completed, the device account may communicate with the TV. After being aware that the TV has accessed, the device account may send a request for obtaining the playing progress of the current program to the device account of the inviter. After receiving the request, the device account of the inviter communicates with the TV to obtain the current playing progress, and responds to the device account of the counterpart to inform the playing progress of the current program. After receiving response, the device account of the invited friend communicates with the TV, so as to inform the TV to start the program and play the program based on the current playing progress.

Here, the friend may not see the received invitation link at the first time, and instead may see the invitation after receiving the invitation link for a period of time. If the counterpart has not watched the corresponding program when the friend responds, the program that the inviter watches and is obtained when obtaining the current playing progress has changed or the TV of the inviter has turned off, the invited friend is prompted about that the invitation has expired.

In order to facilitate initiation of the invitation, all initiated group information is retained. Because the shared group of friends is likely to be the group of friends the user wants to share next time, retaining all the group information is convenient to simplify an inviting operation of the user. If it is the existing group, the user has no need to use the friend relation to select the friends one by one and initiate the invitation, but directly clicks to select the existing group, and initiates the invitation in the group. In such a manner, the operation of selecting the friends over and over again is saved, and the operation of inviting is simpler and faster. As shown in FIGS. 5A and 5B, the flow includes the following steps.

At Step 501, the inviter watches videos by using the device account.

At Step 502, the user sends the invitation link to the friend.

At Step 503, the invitee receives the invitation link and responds.

At Step 504, if the invitee's TV is bound with the device account, the invitee scans the invitation link to directly join the group chat.

At Step 505, if the invitee's TV is not bound with the device account, the invitee joins the group chat after scanning the device account to bind.

At Step 506, the invitee's device account requests to obtain a video watching progress.

At Step 507, the inviter's TV requests the inviter's device account for the current video watching progress.

At Step 508, the inviter's TV responds to the invitee's device account with the video progress.

At Step 509, if the inviter's TV is offline or changes the video content, the invitee is prompted about that the invitation has expired; or else, perform Step 510.

At Step 510: the invitee's TV is started to play the video.

In the embodiment of the disclosure, the user shares the watching feelings with the friend while watching the program, communicating and discussing in real time, and more experience is brought for watching. Although the group is established in the chat application and communications are delivered by using the chat application, it is not necessary to deliver the communications all the time. If there are a lot of friends in the group, the delivery will be very rich, and if the user always stares at the mobile phone to view the delivery of the friends while watching the TV, watching is influenced. For better watching experience, chat information between the friends will be projected on the TV screen through the communication between the device account and the TV, so that the user will not miss the chat content of the friends while watching the video. Besides, the chat content and the played video content are synchronous, and the combination of the played video content and the chat content has a better communication effect without influencing watching the video. In such a manner, the chat content of the friend is projected on the screen in real time still through the wireless communication between the public account and the TV, and some effect displays may be made to projected subtitles, thereby making content display more diversified and more interesting.

The embodiment of the disclosure realizes, through the binding of the device account and the TV, the communication based on the local area network between the TV and the chat application, finally establishes the interconnection between the TVs through the Internet communication of the chat application, uses the simple operation to initiate the group chat of friends through the operation convenience and friend relation chain of the chat application, and realizes the TV-based social contact on the basis of communication and discussion of the watched program, thereby bringing richer experience to watching videos. The user performs interactive communication with the friend while watching the film, thereby enhancing the social relation, and realizing the double harvest of watching and social contact.

Figure 6:
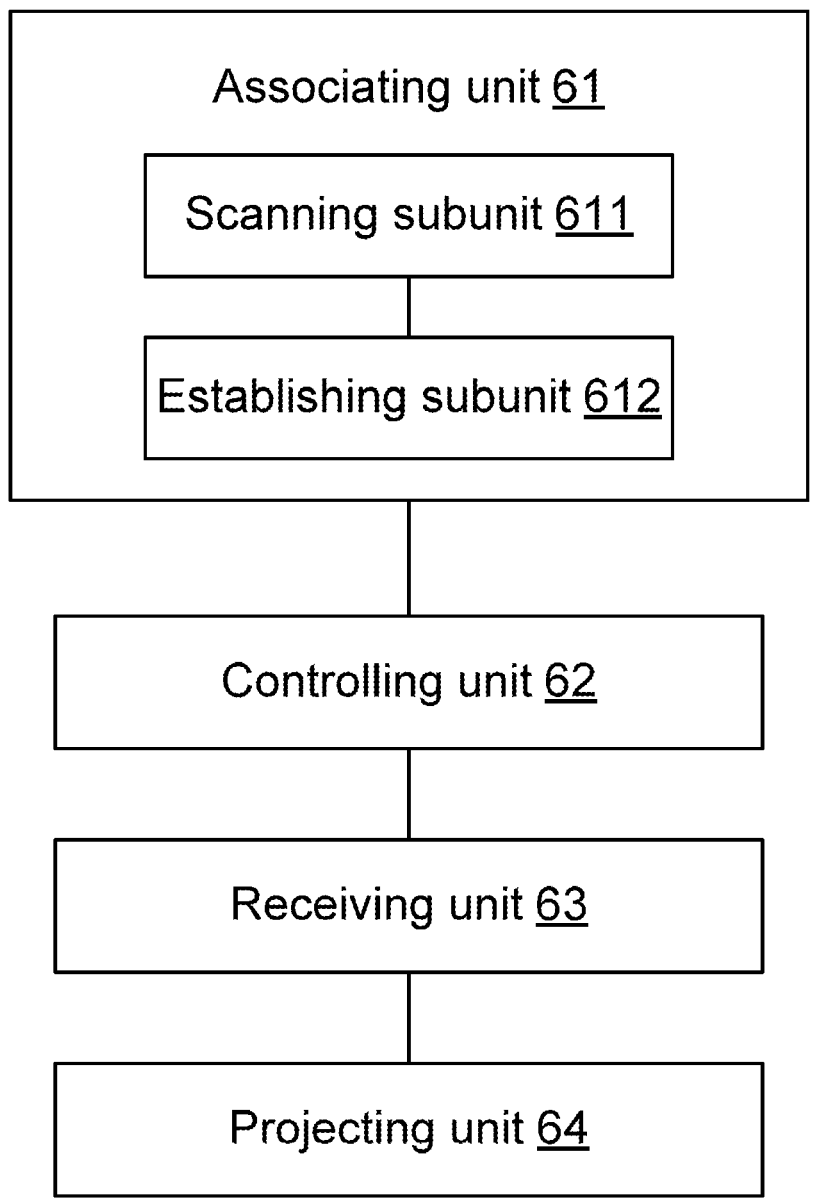
FIG. 6 is a structure diagram illustrating a client according to embodiment one of the disclosure.

FIG. 6 is a structure diagram illustrating a client according to embodiment one of the disclosure. The client in the embodiment is especially the invitee's client. As shown in FIG. 6, the client includes:

an associating module 61 configured to establish the association relationship between the first electronic device and its device account;

a controlling module 62 configured to control the first electronic device to play the first multimedia data by using the device account, and send the invitation link to the client corresponding to the second account;

a receiving module 63 configured to, when the client corresponding to the second account accepts the invitation link, receive the second message data that is sent by the client corresponding to the second account by using the device account, wherein the device account associated with the second account controls the corresponding second electronic device to play the first multimedia data synchronously; and a projecting module 64 configured to send the first message data sent by the client corresponding to the first account and received by the device account and the second message data to the first electronic device, so as to display the message data on the first multimedia data.

The associating module 61 includes:

a scanning submodule 611 configured to log in with the first account, and scan the identifier on the first electronic device, wherein the identifier represents the device account; and an establishing submodule 612 configured to, after the scanning is successful, establish the association relationship between the first electronic device and its device account.

Those skilled in the art should understand that the functions of the modules and submodules in the client shown in FIG. 6 may be understood with reference to the related description of the method for sharing a message. The functions of the modules and submodules in the client shown in FIG. 6 can be realized by either programs running on a processor or specific logic circuits.

Figure 7:
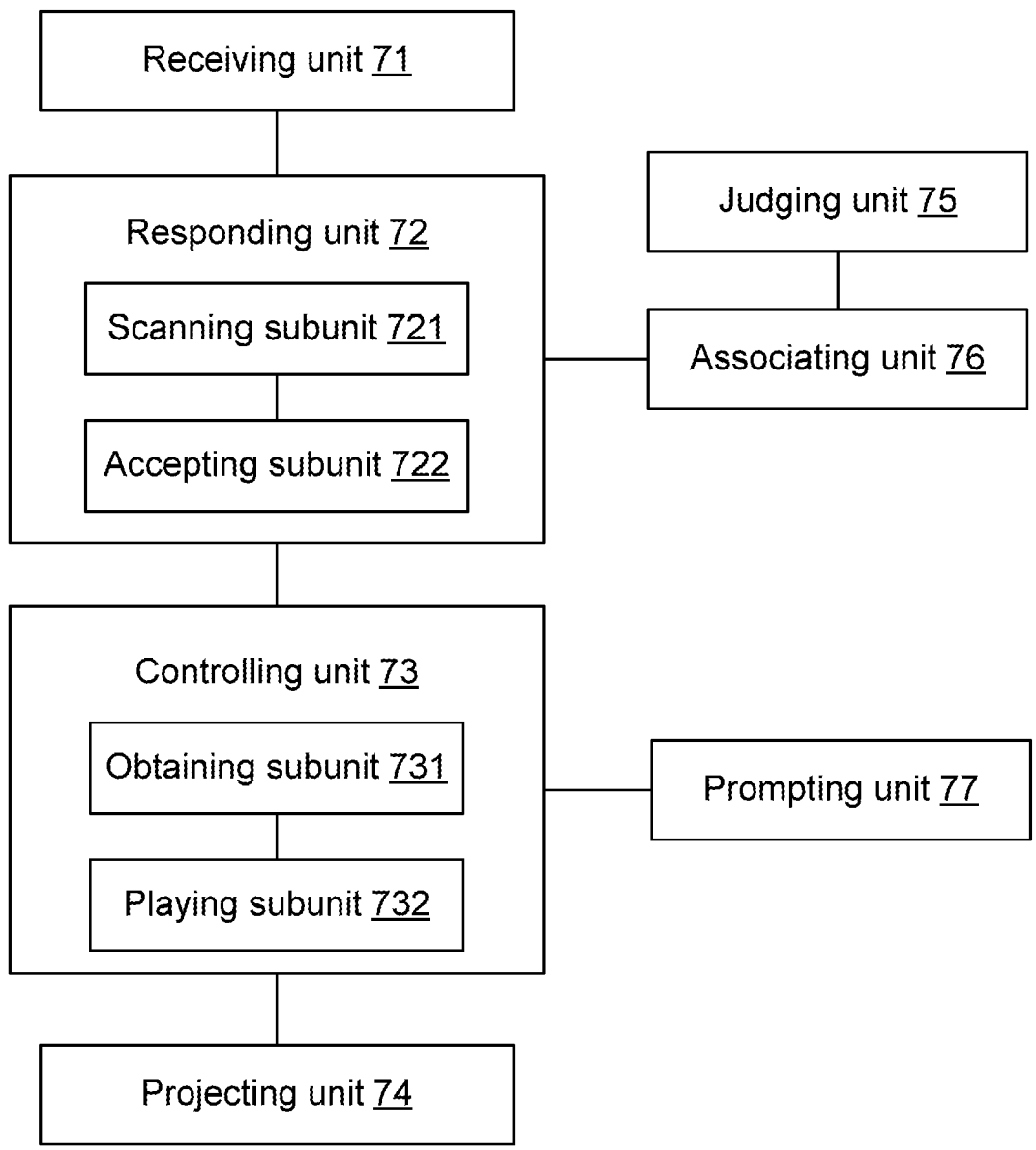
FIG. 7 is a structure diagram illustrating a client according to embodiment two of the disclosure.

FIG. 7 is a structure diagram illustrating a client according to embodiment two of the disclosure. The client in the embodiment is especially the inviter's client. As shown in FIG. 7, the client includes:

a receiving module 71 configured to receive the invitation link sent by the device account associated with the first account, wherein the device account associated with the first account controls the first electronic device to play the first multimedia data;

a responding module 72 configured to respond to the invitation link and send the second message data to the device account associated with the second account;

a controlling module 73 configured to play the first multimedia data on the second electronic device synchronously; and a projecting module 74 configured to send the first message data that is sent by the client corresponding to the first account and received by the device account associated with the second account and the second message data to the second electronic device, so as to display the message data on the first multimedia data.

The client further includes:

a determination module 75 configured to determine whether the second electronic device is associated with the device account corresponding to the second electronic device; and an associating module 76 configured to, when the second electronic device is not associated with the device account corresponding to the second electronic device, establish the association relationship between the second electronic device and the device account corresponding to the second electronic device.

The controlling module 73 includes:

an obtaining submodule 731 configured to obtain the playing progress that the first electronic device plays the first multimedia data; and a playing submodule 732 configured to play the first multimedia data on the second electronic device synchronously according to the playing progress.

The client further includes:

a prompting module 77 configured to, when the obtained playing progress indicates that the first electronic device does not play the first multimedia data currently, send the prompt information.

The responding module 72 includes:

a scanning submodule 721 configured to scan the identifier on the invitation link, and obtain the prompt information for giving a prompt to play the first multimedia data; and an accepting submodule 722 configured to obtain the playing selection operation, and accept the invitation link.

Those skilled in the art should understand that the functions of the modules and submodules in the client shown in FIG. 7 can be understood with reference to the related description of the method for sharing a message. The functions of the modules and submodules in the client shown in FIG. 7 can be realized by either programs running on a processor or specific logic circuits.

The embodiment of the disclosure also provides a client including both the modules of the inviter's client shown in FIG. 6 and the modules of the invitee's client shown in FIG. 7. The client may implement both the function of the inviter and the function of the invitee.

If the integrated modules in the disclosure are implemented in the form of software functional modules and sold or used as independent products, they can also be stored in a computer readable storage medium. Based on this understanding, those skilled in the art should appreciate that the embodiments of the present application can be provided as a method, a system or a computer program product. Accordingly, this present application can adopt full hardware, full software, or a combination thereof. Besides, this present application can adopt the form of a computer program product which is implemented on one or more computer available storage media including computer available program codes, wherein the storage media include, but are not limited to, a USB flash disk, a mobile hard disk drive, a Read-Only Memory (ROM), a Random Access Memory (RAM), a magnetic disk memory, a Compact Disc-ROM (CD-ROM), an optical memory, and so on.

This present application is described according to the flowcharts and/or block diagrams of the method, the device (system) and the computer program product in the embodiments of this present application. It should be understood that each flow and/or block in the flowchart and/or block diagram, and the combination of the flow and/or block in the flowchart and/or block diagram can be implemented by the computer program instructions. These computer program instructions can be provided to the processing module of the general-purpose computer, the specific-purpose computer, the embedded processor or other programmable data processing equipment to generate a machine, so that instructions which are executed by the processing module of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

Although the preferred embodiments of this application have been described, once learning the basic creative concept, those skilled in the art can make other changes and modifications to these embodiments. Accordingly, the claims are intended to include the preferred embodiments and all the changes and modifications in the scope of this application.

Correspondingly, the disclosure also provides a computer storage medium which stores computer executable instructions, wherein the computer executable instructions are used for performing the above methods for sharing a message.

The technical solutions recorded in the embodiments of the disclosure can be combined at random without conflict.

In several embodiments provided in the disclosure, it should be understood that the disclosed methods and smart devices can be realized in other ways. The embodiments of the devices described above are only schematic. The division of the modules only involves logical functions, and there may be other dividing modes during the actual implementation. For example, multiple modules or components can be combined or integrated to another system, or some features may be ignored or are not executed. In addition, coupling, direct coupling, or communication connection among the shown or discussed components can be implemented through indirect coupling or communication connection of some interfaces, devices, or modules, and can be in an electrical form, a mechanical form or other forms.

The above modules described as separate parts may be or may not be separated. The parts shown as the modules may be or may not be the physical modules, and can be either located in a place or distributed on multiple network modules. A part or all of the modules can be selected, according to actual requirements, to achieve the purpose of the solutions of the embodiments.

In addition, all the functional modules in the embodiments of the disclosure can be integrated on a processing module. Alternatively, each of the functional modules serves as a module separately; or two or more than two modules are integrated in a module. The integrated module can be realized in a form of hardware or in a form of hardware and software functional module.

The above is only the specific implementation modes of the disclosure and not intended to limit the protection scope of the disclosure; any change or replacement that those skilled in the art can think of easily in the scope of technologies disclosed by the disclosure shall fall within the protection scope of the disclosure. Therefore, the protection scope of the disclosure is in accordance with the protection scope of the claims.

The invention claimed is:

1. A method for sharing a message, comprising:
    establishing, by a client corresponding to a first account, an association relationship between a first electronic device and a device account thereof;
    controlling, by the client corresponding to the first account, the first electronic device to play first multimedia data by using the device account, and after the first multimedia data has started playing on the first electronic device, sending an invitation link to a client corresponding to a second account, wherein the invitation link includes a playing progress of the first multimedia data playing on the first electronic device, and the invitation link further includes a QR code;
    receiving, by the client corresponding to the first account, second message data sent by the client corresponding to the second account by using the device account of the first electronic device when the client corresponding to the second account accepts the invitation link to join a group chat with the client corresponding to the first account via scanning the QR code included in the invitation link, wherein a device account associated with the second account controls a second electronic device to play the first multimedia data synchronously according to the playing progress included in the invitation link, and chat information transmitted between the client corresponding to the first account and the client corresponding to the second account are projected on screens of the first electronic device and the second electronic device synchronously in real time, and wherein the first electronic device is separate from the second electronic device; and sending, by the client corresponding to the first account, first message data and the second message data to the first electronic device, so as to display the first and second message data on the first multimedia data.

2. The method according to claim 1, wherein establishing, by the client corresponding to the first account, the association relationship between the first electronic device and the device account thereof comprises:

logging in with the first account, and scanning an identifier on the first electronic device, wherein the identifier represents the device account of the first electronic device; and establishing the association relationship between the first electronic device and the device account of the first electronic device after scanning is successful.

3. The method according to claim 2, wherein the identifier is a QR code.

4. The method according to claim 1, further comprising:

upon determining the first multimedia data is not current according to the playing progress, sending prompt information to the client corresponding to the first account, by the client corresponding to the second account, wherein the prompt information indicates the invitation link has expired.

5. A method for sharing a message, comprising:

receiving an invitation link sent by a device account associated with a first account, by a client corresponding to a second account, wherein the device account associated with the first account controls a first electronic device to play first multimedia data, wherein the invitation link is sent after the first multimedia data has started playing at the first electronic device, wherein the invitation link includes a playing progress of the first multimedia data playing on the first electronic device, and wherein the invitation link further includes a QR code;

responding to the invitation link, by the client corresponding to the second account, joining a group chat with a client corresponding to the first account via scanning the QR code included in the invitation link, sending second message data to a device account associated with the second account, and playing the first multimedia data on a second electronic device synchronously according to the playing progress included in the invitation link, wherein chat information between the client corresponding to the first account and the client corresponding to the second account are projected on screens of the first electronic device and the second electronic device synchronously in real time, and wherein the first electronic device is separate from the second electronic device; and sending, by the client corresponding to the second account, first message data sent by a client corresponding to the first account and received by the device account associated with the second account and the second message data to the second electronic device, so as to display the first and second message data on the first multimedia data.

6. The method according to claim 5, further comprising:

after responding to the invitation link, determining whether the second electronic device is associated with the device account corresponding to the second electronic device; and establishing an association relationship between the second electronic device and the device account corresponding to the second electronic device when the second electronic device is not associated with the device account corresponding to the second electronic device.

7. The method according to claim 5, further comprising:

upon determining the first multimedia data is not current according to the playing progress, sending prompt information to the client corresponding to the first account, by the client corresponding to the second account, wherein the prompt information indicates the invitation link has expired.

8. A client, comprising: a memory; and a processor coupled to the memory, the processor being configured to:

receive an invitation link sent by a device account associated with a first account, wherein the device account associated with the first account controls a first electronic device to play first multimedia data, wherein the invitation link is sent after the first multimedia data has started playing at the first electronic device, wherein the invitation link includes a playing progress of the first multimedia data playing on the first electronic device, and wherein the invitation link further includes a QR code;

respond to the invitation link to join a group chat with a client corresponding to the first account via scanning the QR code included in the invitation link and send second message data to the device account associated with a second account;

play the first multimedia data on a second electronic device synchronously according to the playing progress included in the invitation link;

project chat information between the client corresponding to the first account and the client corresponding to the second account to screens of the first electronic device and the second electronic device synchronously in real time, wherein the first electronic device is separate from the second electronic device; and send first message data sent by the client corresponding to the first account and received by the device account associated with the second account and the second message data to the second electronic device, so as to display the first and second message data on the first multimedia data.

9. The client according to claim 8, wherein the processor is further configured to:

determine whether the second electronic device is associated with the device account corresponding to the second electronic device; and establish an association relationship between the second electronic device and the device account corresponding to the second electronic device, when the second electronic device is not associated with the device account corresponding to the second electronic device.

10. The client according to claim 8, wherein the processor is further configured to:

upon determining the first multimedia data is not current according to the playing progress, send prompt information to the client corresponding to the first account, by the client corresponding to the second account, wherein the prompt information indicates the invitation link has expired.

\* \* \* \* \*